(12) United States Patent
Chrisman et al.

(10) Patent No.: US 9,771,844 B2
(45) Date of Patent: *Sep. 26, 2017

(54) TWO-STROKE LEAN BURN GAS ENGINE WITH A SILENCER-CATALYTIC CONVERTER

(71) Applicant: GE Oil & Gas Compression Systems, LLC, Houston, TX (US)

(72) Inventors: Bruce M. Chrisman, Oklahoma City, OK (US); Thomas J. Hurley, Oklahoma City, OK (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 436 days.

This patent is subject to a terminal disclaimer.

(21) Appl. No.: 14/177,007

(22) Filed: Feb. 10, 2014

(65) Prior Publication Data

US 2014/0223891 A1   Aug. 14, 2014

Related U.S. Application Data

(60) Continuation of application No. 12/906,981, filed on Oct. 18, 2010, now Pat. No. 8,646,260, which is a
(Continued)

(51) Int. Cl.
*F01N 3/10* (2006.01)
*F01N 3/035* (2006.01)
(Continued)

(52) U.S. Cl.
CPC ............ *F01N 3/035* (2013.01); *F01N 1/166* (2013.01); *F01N 3/037* (2013.01); *F01N 3/2885* (2013.01);
(Continued)

(58) Field of Classification Search
USPC ......... 60/274, 287, 391, 292, 295, 297, 299, 60/312, 314, 324; 181/249, 251, 253,
(Continued)

(56) References Cited

U.S. PATENT DOCUMENTS 3,276,202 A    10/1966  Wright
3,476,524 A  * 11/1969  Burke .................... B01D 50/00
                                                422/170
(Continued)

FOREIGN PATENT DOCUMENTS

JP            409158722        6/1997

*Primary Examiner* — Binh Q Tran
(74) *Attorney, Agent, or Firm* — Mintz Levin Cohn Ferris Glovsky and Popeo, P.C.

(57) ABSTRACT

A low emissions 2-stroke natural gas fueled engine includes at least one cylinder with an exhaust port in communication with a silencer-catalytic converter unit. The unit has first and second volumes in communication with each other. The first volume damps spurious exhaust pressure excursions and removes particulates in the exhaust. The second volume houses an oxidation catalyst for treating exhaust to reduce exhaust emissions. The engine oil has at most 10 ppm zinc content to reduce metal poisons contained in the exhaust prior to contact with the oxidation catalyst. The engine oil preferably has a very low ash content to minimize sulfur combustion components in the exhaust to reduce masking of the oxidation catalyst. The first volume preferably has a pressure relief valve set to relieve at a pressure greater than the maximum normal operating pressure of the engine to avoid excessive pressure excursions of the engine exhaust from damaging the oxidation catalyst.

17 Claims, 7 Drawing Sheets

Related U.S. Application Data continuation of application No. 11/931,680, filed on Oct. 31, 2007, now Pat. No. 7,818,963, which is a division of application No. 10/853,601, filed on May 25, 2004, now Pat. No. 7,464,543.

(51) Int. Cl.
*F01N 1/16* (2006.01)
*F01N 3/037* (2006.01)
*F01N 3/28* (2006.01)

(52) U.S. Cl.
CPC ...... *F01N 2470/18* (2013.01); *F01N 2490/04* (2013.01)

(58) Field of Classification Search
USPC .................................. 181/254, 255, 264, 269
See application file for complete search history.

(56) References Cited

U.S. PATENT DOCUMENTS

| | | | |
|---|---|---|---|
| 3,647,394 A * | 3/1972 | Wetch | B01D 53/56 261/116 |
| 3,775,064 A * | 11/1973 | Berger et al. | 422/171 |
| 3,853,484 A * | 12/1974 | Sudar | B01D 53/86 261/116 |
| 4,426,844 A | 1/1984 | Nakano | |
| 4,851,015 A | 7/1989 | Wagner et al. | |
| 4,867,270 A | 9/1989 | Wissmann et al. | |
| 4,916,897 A | 4/1990 | Hayashi et al. | |
| 5,016,438 A | 5/1991 | Harris | |
| 5,052,178 A * | 10/1991 | Clerc et al. | 60/274 |
| 5,212,948 A * | 5/1993 | Gillingham | F01N 1/02 55/314 |
| 5,338,903 A | 8/1994 | Winberg | |
| 5,435,347 A | 7/1995 | Gillingham | |
| 5,612,006 A | 3/1997 | Fisk | |
| 5,738,184 A | 4/1998 | Masuda et al. | |
| 5,808,245 A * | 9/1998 | Wiese | F01N 3/005 181/255 |
| 5,809,776 A | 9/1998 | Holtemann et al. | |
| 5,857,324 A | 1/1999 | Scappatura et al. | |
| 5,866,859 A | 2/1999 | Karlsson et al. | |
| 5,902,971 A | 5/1999 | Sato et al. | |
| 5,916,128 A | 6/1999 | Garr et al. | |
| 5,921,079 A * | 7/1999 | Harris | B01D 53/9454 422/177 |
| 6,109,026 A | 8/2000 | Karlsson et al. | |
| 6,233,926 B1 | 5/2001 | Bailey et al. | |
| 6,277,784 B1 | 8/2001 | Kruse | |
| 6,315,076 B1 | 11/2001 | Bruck et al. | |
| 6,357,227 B1 * | 3/2002 | Neufert | B01D 53/9431 60/281 |
| 6,403,039 B1 | 6/2002 | Bruck | |
| 6,588,203 B2 | 7/2003 | Hirota et al. | |
| 6,622,482 B2 | 9/2003 | Knight et al. | |
| 6,722,124 B2 | 4/2004 | Pawson et al. | |
| 6,789,385 B2 | 9/2004 | Glover | |
| 6,821,932 B2 | 11/2004 | Guinther et al. | |
| 6,823,660 B2 * | 11/2004 | Minami | 60/280 |
| 6,874,316 B2 * | 4/2005 | Nakatani | 60/286 |
| 6,918,463 B2 | 7/2005 | Takahashi et al. | |
| 6,935,105 B1 | 8/2005 | Page et al. | |
| 6,935,285 B2 | 8/2005 | Yuasa et al. | |
| 7,281,606 B2 | 10/2007 | Marocco | |
| 7,350,349 B2 | 4/2008 | Olofsson | |
| 7,464,543 B2 * | 12/2008 | Chrisman et al. | 60/299 |
| 7,690,194 B2 | 4/2010 | Chrisman et al. | |
| 7,713,493 B2 * | 5/2010 | Bosanec, Jr. | F01N 1/083 422/180 |
| 7,765,799 B2 | 8/2010 | Chrisman et al. | |
| 7,818,963 B2 * | 10/2010 | Chrisman et al. | 60/312 |
| 8,646,260 B2 * | 2/2014 | Chrisman et al. | 60/314 |
| 2008/0072579 A1 | 3/2008 | Chrisman et al. | |

\* cited by examiner

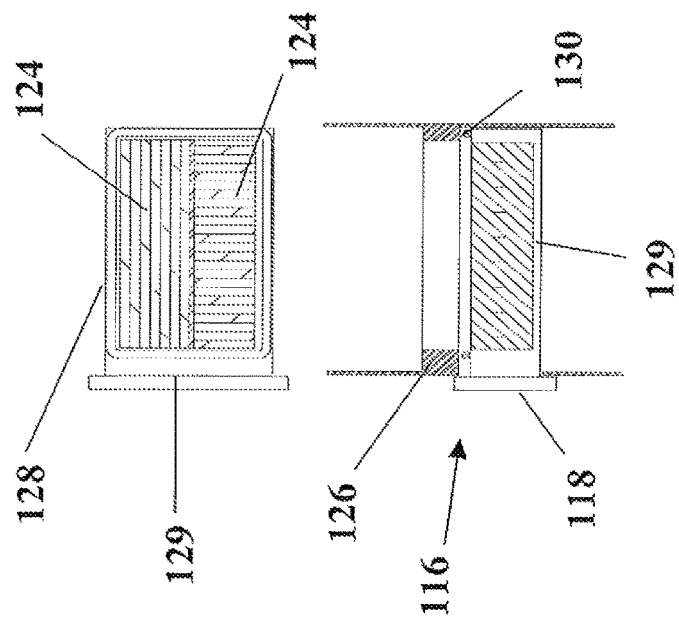

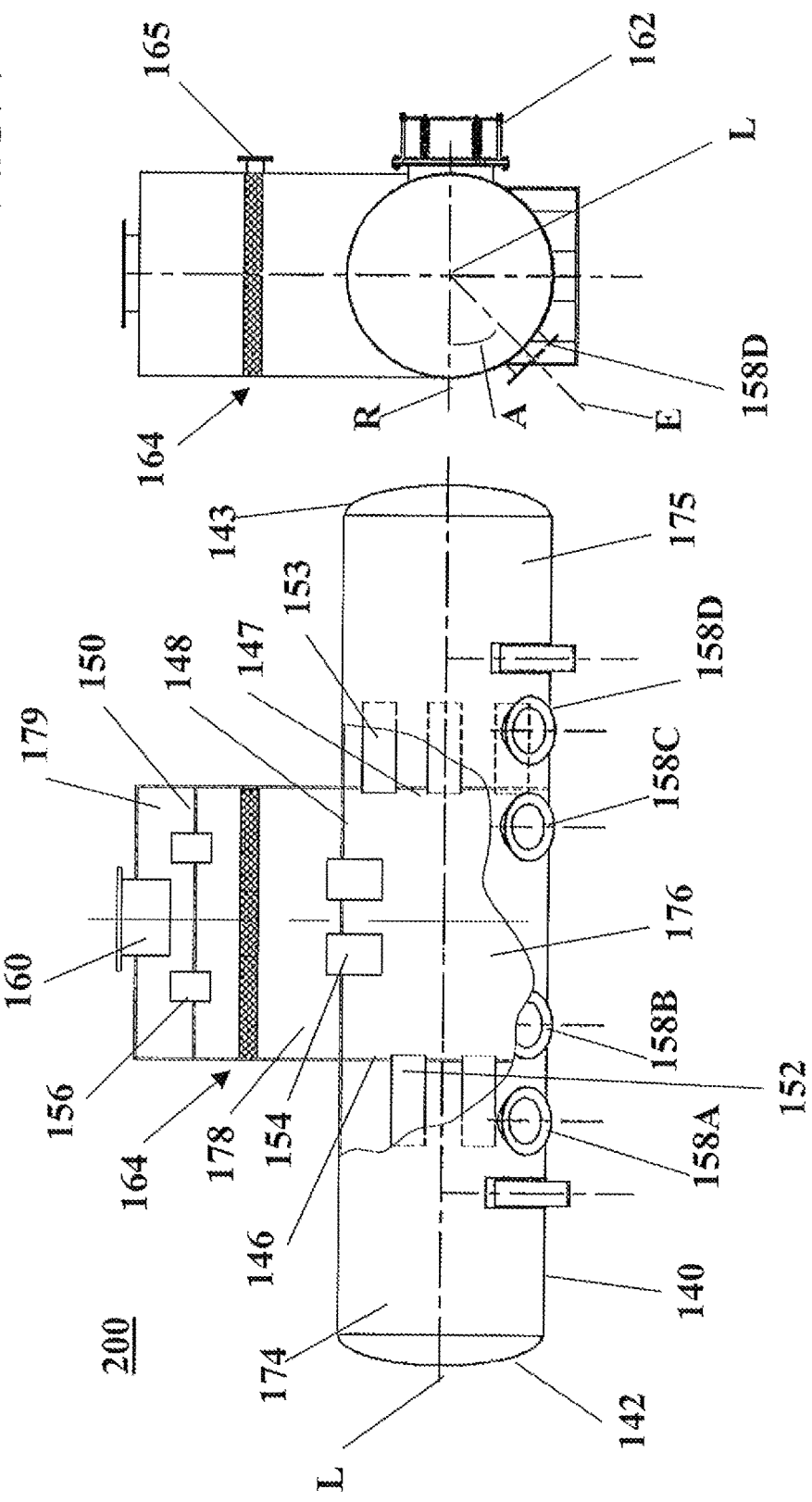

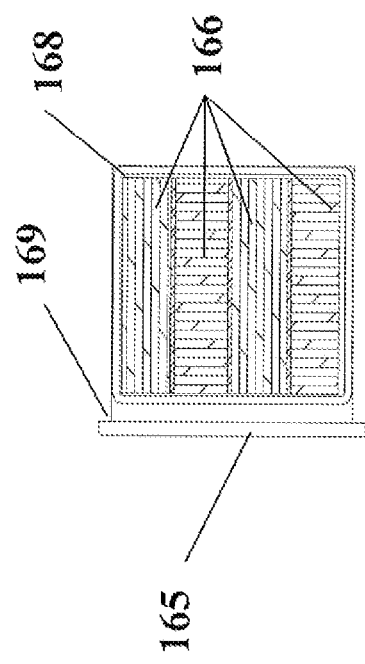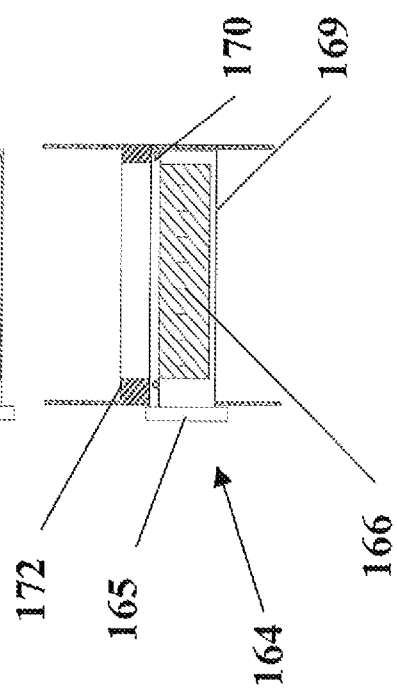
FIG. 9
FIG. 8

TWO-STROKE LEAN BURN GAS ENGINE WITH A SILENCER-CATALYTIC CONVERTER

CROSS REFERENCE TO RELATED APPLICATIONS

This application is a continuation of U.S. patent application Ser. No. 12/906,981, filed on Oct. 18, 2010, issuing as U.S. Pat. No. 8,646,260 on Feb. 11, 2014, which is hereby incorporated by reference in its entirety, and which is a continuation of U.S. patent application Ser. No. 11/931,680, filed on Oct. 31, 2007, issued as U.S. Pat. No. 7,818,963 on Oct. 26, 2010, which is hereby incorporated by reference in its entirety, and which is a divisional of U.S. patent application Ser. No. 10/853,601, filed on May 25, 2004, issued as U.S. Pat. No. 7,464,543 on Dec. 16, 2008, which is hereby incorporated by reference in its entirety.

FIELD OF THE INVENTION

The present invention relates to a silencer-catalytic converter unit for use with an internal combustion engine, in particular to a two-stroke lean burn internal combustion engine using a normally gaseous hydrocarbon as fuel. The present invention further relates to a two-stroke engine incorporating the silencer-catalytic converter unit. Additionally, the present invention relates to a method for converting an existing 2-stroke engine to a low emissions 2-stroke engine. Finally, the present invention relates to a method for reducing carbon monoxide, formaldehyde and volatile organic compounds (VOC) emissions in the exhaust of a 2-stroke natural gas fueled engine.

BACKGROUND OF THE INVENTION

Two-stroke (alternatively referred to as two-cycle) engines have been known for many years and have been applied in a range of applications. One class of two-stroke engines is the class of engines operating on a normally gaseous hydrocarbon, most commonly natural gas, under lean burn conditions. Such engines are generally large, slow running engines of a stationary design and find application in the driving of rotating and reciprocating equipment 10, such as compressors 12 and electric generators 12. One example of commercially available engines is the Ajax® series of engines manufactured and sold by the Cooper Energy Services division of Cooper Cameron Corporation. The Ajax engines are two-stroke engines having from one to four cylinders. When used to drive a compressor 12, the Ajax engines are commonly employed in a configuration in which the cylinders of a reciprocating compressor 12 are driven from the same crankshaft as the cylinders of the engine.

Engines of this class generally operate at low speeds, that is speeds of the order of from several hundred to a thousand revolutions per minute. The engines are generally operated in a constant speed mode, in which a substantially constant speed is maintained under a variety of engine loads. As the power demand placed on the engine is increased, the combustion efficiency and performance of the engine improves.

Recent environmental regulations have been increasing the emphasis on the importance of reducing the levels of partially burned fuel constituents from the exhaust of stationary engines. These regulated exhaust emissions consist of CO, NMHC, and formaldehyde ($CH_2O$). An oxidizing catalyst in the exhaust stream will produce dramatic reductions in the levels of these emissions. Accordingly, there is a need for a way to reduce carbon monoxide, formaldehyde and volatile organic compounds (VOC) emissions from engines in this class.

One method of reducing the amount of such emissions in other types of internal combustion engines is to employ a catalytic converter in the exhaust system of the engine. The catalytic converter converts such emissions in the exhaust gases to less harmful emissions before they are emitted to the atmosphere. However, that has proven more difficult in practice. Previous industry experience with applying oxidizing converters to 4-stroke natural gas fueled engines indicates satisfactory results relative to the removal efficiencies of the subject emissions and the duration of operating time accumulated between catalyst cleaning and/or element replacement. However, previous tests of oxidizing catalysts with 2-stroke natural gas fueled engines have demonstrated good removal efficiencies for only short time periods. Therefore, currently available lean burn catalyst systems are limited to 4-stroke engine applications.

The majority of oxidation catalysts use a combination of platinum (Pt), rhodium (Rh), and palladium (Pd). Under the lean conditions that these engines are run, there is excess oxygen present in the exhaust. With excess oxygen present, oxidation catalysts are effective at eliminating carbon monoxide, formaldehyde and VOC emissions.

All of the chemical reactions that occur in a catalyst occur at the surface. So, any decrease in the surface area or the number of active sites available of the catalyst results in a decrease in the effectiveness of the catalyst. The specific deactivation mechanisms present in 2-stroke lean burn natural gas engines include selective poisoning and non-selective poisoning.

Selective poisoning occurs when a material reacts directly with the catalytic material rendering it unable to function as a catalyst. Poisoning is generally a reversible process, which is treated by using heat, washing or simply removing the poison from the exhaust stream. Sulfur from engine oil in the exhaust stream is a major contributor to catalyst poisoning.

Non-selective poisoning is also referred to as masking or fouling. It is the result of materials in the exhaust flow that accumulate on the catalyst surface. Phosphorous compounds and other materials, which are common in lubricating oils and in partially burned combustion products, can be found on the surface of the catalyst.

Differences in catalyst performance are also affected by temperature. Higher temperatures increase catalyst efficiency and may impede poisoning. The difference in temperatures is why 4-stroke natural gas fueled engines have been successfully outfitted with catalytic converters and why there is still a need for them in 2-stroke natural gas fueled engines. The difference in temperatures is due to the differences in engine design. Because of the scavenging process, 2-stroke engines have cooler exhaust temperatures than 4-stroke engines that consequently hinder exhaust performance.

M. DeFoort et al. of Colorado State University reported these problems and differences at the Gas Machinery Conference 2002 in Nashville, Tenn. on Oct. 8, 2002, in their paper entitled Performance Evaluation of Oxidation Catalysts for Natural Gas Reciprocating Engines. This paper discloses the use of a catalyst in an attempt to treat the exhausts from 2-stroke and 4-stroke lean burn natural gas fueled engines. The catalyst efficiency dropped from 95% to 80% for CO and from 75% to 45% for formaldehyde during the catalyst aging process for a large bore 2-stroke engine (about 200 hours). However, the results for the medium bore 4-stroke engine were better due to the nearly 200 degree F. higher catalyst temperatures. The catalyst efficiency dropped from 99.2% to 97.7% for CO and from essentially 100% to 67% for formaldehyde during the catalyst aging process (about 150 hours).

The specific 2-stroke engine used was a Cooper-Bessemer GMV-4TF stationary internal combustion engine having four cylinders with a manufacturer's sea level rating of 440 brake-horsepower (bhp) at 300 rpm. The cylinders were 14 inches in diameter with a 14-inch stroke. Air was delivered to the engine using a supercharged air delivery system. During the scavenging process, about half of the air supplied to the engine passed through the engine and was not trapped in the cylinder. The other half of the supplied air was trapped in the cylinder and participated in the combustion process. The catalyst was contained in a housing having four units, each measuring 12"×16"×3". The housing was inserted in the exhaust line, but its location is not clear from the article since FIG. 6.1 showing its location was not published with the article.

M. DeFoort et al. analyzed the catalyst used with the 2-stroke engine. They found that the leading edge of the catalyst had three oxides not present in the trailing edge of the catalyst. These were oxides formed from copper (CuO), phosphorus ($P_2O_5$) and zinc (ZnO). Sulfur also played a role in the deterioration of the catalyst. The elements copper, phosphorus and zinc, plus other elements such as iron and calcium, contributed to the deactivation of the catalyst, all of which are known catalyst poisons originating from engine lubricants and coolants. In addition, black soot was found on the leading edge of the catalyst.

In summary, M. DeFoort et al. concluded based on their results that oxidation catalysts were not likely to be effective for large bore 2-stroke lean burn engines. The oxidation catalyst showed clear signs of poisoning in a relatively short period of time (less than 250 hours) when compared to the expected lifespan of the catalyst.

While catalytic converters for a 2-stroke engine are known in the art, their application has been limited to 2-stroke engines of much smaller capacity and operating at speeds far greater than those of the class of engines addressed by the present invention. See, for example, catalytic converters disclosed in U.S. Pat. No. 6,277,784 (for small engines); and muffler/catalytic converter combinations disclosed in U.S. Pat. No. 4,867,270 (for portable hand tools); U.S. Pat. No. 5,866,859 (for portable work tools); U.S. Pat. No. 5,916,128 (for small 2-stroke engine); U.S. Pat. No. 6,109,026 (for portable work tools); U.S. Pat. No. 6,315,076 (for small engines); U.S. Pat. No. 6,403,039 (for small engines); and U.S. Pat. No. 6,622,482 (for small engine applications).

To date because of the problems noted by M. DeFoort et al., such catalytic converter exhaust systems have not been applied to large capacity 2-stroke lean burn engines operating on a normally gaseous hydrocarbon fuel and operating at speeds at or below about 1000 rpm.

Accordingly, there is a need for a solution to the problem of achieving lower carbon monoxide and formaldehyde emissions in the exhaust from large capacity 2-stroke lean burn engines operating on a normally gaseous hydrocarbon fuel and operating at speeds at or below about 1000 rpm, while maintaining a satisfactory level of catalyst efficiency and requiring little maintenance over and above the existing maintenance schedules.

SUMMARY OF THE INVENTION

Accordingly, the present invention satisfies this need by broadly providing a combination exhaust silencer and oxidizing catalytic converter unit applied to a large capacity two stroke, lean burn (2SLB), gaseous fueled engine operating at speeds at or below about 1000 rpm and utilizing a lubricating oil with a zinc content of at most 10 ppm and which preferably has a very low ash content (less than 0.1 wt %).

In one aspect of the invention, there is provided a low emissions 2-stroke natural gas fueled engine. The engine includes at least one cylinder with an inlet port and an exhaust port, and a silencer-catalytic converter unit, wherein the exhaust port in communication with the silencer/converter. In one embodiment, an exhaust line is connected at one end to the exhaust port and at the other end to the silencer/converter unit, thereby placing the exhaust port in communication with the silencer/converter. In another embodiment, an exhaust line is connected at one end to the exhaust port and at the other end to an exhaust manifold with the silencer/converter unit connected to an exhaust manifold, thereby placing the exhaust port in communication with the silencer/converter. The silencer-catalytic converter unit comprises a first volume and a second volume; wherein the first volume and the second volume are in communication with each other. The first volume is for dampening spurious exhaust pressure excursions and for removing at least a portion of the particulates contained in an untreated engine exhaust. The first volume can be one or more chambers. The second volume houses an oxidation catalyst for reducing emissions in a treated engine exhaust below the emissions in the untreated engine exhaust. The engine also has a lubricating engine oil having a zinc content of at most 10 ppm, thereby reducing the metal poisons contained in the untreated exhaust prior to contact with the oxidation catalyst. Preferably, the lubricating engine oil has a zinc content of at most 5 ppm. The lubricating engine oil is preferably produces very low ash, thereby minimizing the amount of sulfur combustion components contained in the untreated engine exhaust to reduce masking of the oxidation catalyst. The first volume preferably has a pressure relief valve set to relieve at a pressure greater than the maximum normal operating pressure of the engine to avoid excessive pressure excursions of the engine exhaust from damaging the oxidation catalyst.

In another aspect of the invention, there is provided a method for converting an original 2-stroke natural gas fueled engine to a converted 2-stroke natural gas fueled engine having lower emissions. The method comprises providing the original 2-stroke natural gas fueled engine producing an untreated engine exhaust containing particulates. The original engine has at least one or more cylinders with an inlet port and an exhaust port, a silencer in communication with the exhaust port; and an unmodified lubricating engine oil having a zinc content of at least 300 ppm. The method also includes replacing the silencer with a silencer-catalytic converter unit. The silencer-catalytic converter unit includes a first volume for dampening spurious exhaust pressure excursions and removing at least a portion of the particulates contained in the untreated engine exhaust, and a second volume housing an oxidation catalyst for reducing emissions in a treated engine exhaust below the emissions contained in the untreated engine exhaust, wherein the first volume and the second volume are in communication with each other. The method further includes positioning the oxidation catalyst within the second chamber such that the untreated engine exhaust has a temperature of at least 600 degrees F.; and replacing the unmodified lubricating engine oil with a low metals lubricating engine oil having a zinc content of at most 10 ppm, more preferably at most 5 ppm, thereby reducing the metal poisons contained in the untreated engine exhaust prior to contact with the oxidation catalyst. Preferably, this method also includes the step of installing a pressure relief valve in the first volume set to relieve at a pressure greater than the maximum normal operating pressure of the engine to avoid excessive pressure excursions of the engine exhaust from damaging the oxidation catalyst. The low metals lubricating engine oil preferably produces a very low ash content (less than 0.1 wt %), thereby minimizing the amount of sulfur combustion components contained in the untreated engine exhaust to reduce masking of the oxidation catalyst.

In yet another aspect of the present invention, there is provided a method for reducing carbon monoxide, formaldehyde and VOC emissions in the exhaust of a 2-stroke natural gas fueled engine. The method includes lubricating said engine with a lubricating engine oil composition having a zinc content of at most 10 ppm, more preferably at most 5 ppm; feeding an untreated engine exhaust of the engine to a silencer/converter to produce a treated engine exhaust; and positioning the oxidation catalyst within the second chamber such that the untreated engine exhaust has a temperature of at least 600 degrees F. The silencer/converter has at least a first volume for dampening spurious exhaust pressure excursions and removing at least a portion of the particulates contained in the untreated engine exhaust, and a second volume housing an oxidation catalyst for reducing emissions in the treated engine exhaust below the emissions in the untreated engine exhaust. The first volume and the second volume are in communication with each other. The lubricating engine oil utilized herein preferably produces very low ash (less than 0.1 wt %), thereby minimizing the amount of sulfur combustion components contained in the untreated engine exhaust to reduce masking of the oxidation catalyst. Preferably, the method includes the further step of installing a pressure relief valve in communication with the first volume set to relieve at a pressure greater than the maximum normal operating pressure of the engine to avoid excessive pressure excursions of the engine exhaust from damaging the oxidation catalyst.

In further aspect of the present invention, there is provided a silencer-catalytic converter unit for a 2-stroke natural gas fueled engine. The silencer-catalytic converter unit includes an oxidation catalyst for reducing carbon monoxide and formaldehyde emissions in an untreated engine exhaust; a first volume for dampening spurious exhaust pressure excursions and removing at least a portion of the particulates contained in the untreated engine exhaust; a second volume housing the oxidation catalyst for reducing emissions in a treated engine exhaust below the emissions in the untreated engine exhaust; and a pressure relief valve in communication with the first volume set to relieve at a pressure greater than the maximum normal operating pressure of the engine exhaust to avoid excessive pressure excursions of the engine exhaust from damaging the oxidation catalyst. The first volume and the second volume are in communication with each other. The oxidation catalyst is positioned within the second chamber such that during operation of the engine the untreated engine exhaust has a temperature of at least 600 degrees F. at that position. Preferably, at least one exhaust flow pipe provides the communication between the first and second volumes. Each of the at least one exhaust flow pipes has a catalyst facing end which is closest to the first catalyst face of the oxidation catalyst. The distance between the catalyst facing end and the first catalyst face is sufficient to provide a substantially uniform flow of the untreated exhaust upon contact across the first catalyst face during engine operation. This enhances the utilization of the oxidation catalyst.

Catalyst:

The oxidation catalyst reduces the concentration of carbon monoxide, formaldehyde and VOC's in the engine exhaust. Such catalysts are commercially available, for example, from EAS, Inc., Crystal Lake, Ill., and Johnson-Matthey, Malvern, Pa.

The U.S. EPA rule that was promulgated in March, 2004 requires CO removal efficiency to be at 58% or higher for two stroke, gas fueled engines. Preferably, the catalysts are selected sized to produce at least a 70% removal of CO and a 55% removal of formaldehyde. This will allow for a gradual degradation of catalyst efficiency over a sufficiently long period of time between periods of catalyst regeneration or replacement, preferably coinciding with other scheduled engine maintenance.

An example of a particularly preferred catalyst is provided by EAS, Inc. with the tradename ADCAT™ catalyst. This catalyst uses platinum on a stainless steel honeycomb substrate. After our experiments with this catalyst, a standardized size for the catalyst element was defined for use on all Ajax® engine models. Each Ajax® engine will use one of these catalyst elements per power cylinder. These elements are 12.5" wide×34" long×3.7" thick. The face surface area and the thickness for the catalyst were determined from our tests and based on the flow area and an estimate of the exhaust residence time in the catalyst needed to produce the required emissions removal efficiencies.

The catalytic converter must provide the required emissions removal efficiencies throughout the normal engine operating range, which is 265 RPM to 440 RPM and from 50% to 100% torque. The above range extends from 60 to 200 BHP per power cylinder. The converter is required to operate properly with the wide range of fuel gases, which are typically used at various field sites. This variety includes fuels having lower heating values (LHV) from 450 to 1500 BTU/ft$^3$. On the lower end of the LHV range, these fuels contain high quantities of inert gases like $CO_2$ and $N_2$. On the upper end of the LHV range, these fuels contain high quantities of the heavier hydrocarbons, like propane, butane, and small amounts of pentane.

The primary areas of focus for our experiments were: (1) operation near the design rating, which is 200 BHP per cylinder, and (2) use of pipeline quality fuel gas, which consists mainly of methane and has an LHV of 950 BTU/ft$^3$.

Catalyst Retaining Rack:

A catalyst element retaining rack is located inside the second chamber or volume of the silencer-catalytic converter unit (See FIGS. 3 and 6). This concept results in providing exhaust silencing while also serving as a catalyst housing. It also assures that the catalyst operating temperatures are high enough to achieve large removal efficiencies for the exhaust emissions.

Catalyst Surface Area and Residence Time:

Based on our testing to date, we expect that the engine will operate for more than 4000 hours before regeneration of the catalyst elements is needed. Measurement of CO before and after the catalyst is the preferred method for determining when the catalyst needs to be regenerated. At the end of our 500-hour lab test, the CO removal efficiency was about 92%. We expect that more than six months of continuous operation can be completed before the CO removal efficiency drops to the 58% level.

Preferably, there is one catalyst element per power cylinder of the engine. The catalyst element in one embodiment is 12.5" wide×34" long×3.7" thick. Therefore, the overall width of a set of catalyst elements is equal to the number of power cylinders times the width of a single catalyst element, which in this case the width is 12.5".

This catalyst element weighs 45 lbm. As a result, these catalyst elements can be installed without the crane and installation/removal device. However, in an earlier embodiment, a single round catalyst element was used for the lab tests and it weighed more than 200 lbm. This larger and heavier catalyst element required the use of a hoist and installation/removal device shown in FIG. 10.

Based on our tests, we have determined a direct relationship between exhaust flow and catalyst surface area and between exhaust flow and catalyst thickness. If less catalyst is used, then the emissions removal efficiencies are inadequate. If more catalyst is used, then the removal efficiencies for CO, VOC's and $H_2CO$ are increased, but the $NO_X$ increase across the catalyst becomes unacceptable.

The total face surface area for the catalytic elements is preferably from about 20 to about 30 sq. in., more preferably from about 24 to about 28 sq. in., for each 100 actual $ft^3$/min of exhaust flow, where "actual" means that the flow is referenced to the exhaust temperature at the catalyst. For the EAS catalyst tested, the preferred total face surface area for the catalytic elements is from about 24 to about 28 sq. in. for each 100 actual $ft^3$/min of exhaust flow.

The effective residence time for exhaust to spend in the catalyst is preferably from about 0.025 to about 0.050 seconds, more preferably from about 0.030 to about 0.040 seconds, and yet more preferably from about 0.031 to about 0.037 seconds. For the EAS catalyst tested, the effective residence time was preferably from about 0.031 to about 0.037 seconds. The term "effective residence time" is based on the thickness of the catalyst element. Actual residence time would be slightly higher because the path traveled through the catalyst is slightly longer than a straight line.

Relative to the EAS catalyst tested, other catalysts can have the same or different amounts of noble metal and the same or different exposed areas of the catalyst material to the exhaust passing through the catalyst element, depending on their internal structure. The above preferred ranges for the EAS catalyst would be good initial estimates for other catalysts, but routine testing of the catalysts can be used to determine their optimum face surface area and residence time factors.

Catalyst Location:

The preferred location for the catalyst is determined from the following factors:

a. Exhaust Tuning:

The exhaust is tuned to maximize the power output from a two-stroke engine. This involves the length of the exhaust pipe from the power cylinder to the end of the exhaust pipe. As is known to those skilled in the art, the exhaust pipe length is dependent on the swept volume for the power cylinder, the crank angle at which the exhaust ports open, and the rated speed for the engine. The preferred exhaust pipe length for the Ajax 2801LE, 2802LE, 2803LE, & 2804LE engines is 15'-6".

b. Volume of the First Chamber of the Silencer/Converter:

The volume of the first chamber or volume of the silencer/converter is a function of the swept volume of the power cylinders (engine displacement). The volume of the first chamber of the silencer/converter is preferably equal to the number of exhaust pipes connected to that chamber times the swept volume for one cylinder times about 18, which is large enough to contain the exhaust from about 17 to 19 revolutions of the engine. This is the preferable volume to damp out the exhaust pulsations without upsetting the tuning effects gained from the tuned exhaust pipe.

c. Temperature:

To achieve acceptable emissions removal efficiencies, the oxidation catalyst must be in a location where the exhaust temperature is about 600° F., or higher. Therefore, the silencer/converter of the present invention is designed and installed to position the catalyst relative to the engine exhaust port such that this temperature is achieved.

Baffle and Flow Pipes:

A system of internal baffles and pipes is arranged inside the silencer/converter so that the catalyst element is protected from masking or fouling from liquid or particulate carryover into the exhaust. This system also protects the catalyst from sudden high pressure excursions and pulsations in the exhaust system (see FIGS. 3 and 6).

The main design feature that is pertinent to achieving a satisfactory catalyst life is based on causing the changes to the direction and to the flow rate of the exhaust prior to entering the catalyst. This feature results in minimal carry-over of liquid droplets and particulates to the catalyst.

The prior art silencers do not include considerations of limiting the carry-over of liquid droplets and particulates and they do not include any provision for the installation of a catalyst.

The new silencer/converter designs of the present invention have many similarities with the prior art silencer design by necessity since both designs perform the exhaust silencing function. However, the silencer/converter of the present invention includes additional features, which are described herein, relating to the incorporation and protection of the oxidation catalyst.

A baffle and flow pipes must be place in the silencer/converter ahead of the catalyst to protect the catalyst from liquid and particulate carry-over from the exhaust pipes.

A sufficient distance between (1) the exits of the flow pipes from the first chamber or volume into the second chamber or volume and (2) the catalyst face is preferred to allow the exhaust flow to be distributed evenly across the face of the catalyst. For example, with a silencer/converter cross sectional flow area of 8-12 $ft^2$ and an exhaust flow of about 1400-1600 actual $ft^3$/min per engine cylinder, this distance is preferably a minimum of about 1½ feet.

The volumes of the chambers in the silencer/converter are dependent on the swept volume of the power cylinders. The flow areas of the pipes between these chambers are dependent on the total exhaust flow rate. Relative to protecting the catalyst from masking due to liquid droplets or particulates, the main functions of the baffles and pipes are to:

1. Reduce the flow velocity as the exhaust enters the first volume chamber causing liquid and solid constituents to drop out of the exhaust stream.
2. Produce some radical changes in flow direction to promote the drop out process.
3. Increase the exhaust flow velocity as the exhaust passes through the pipes between the volume chambers.
4. Substantially reduce the amplitude of the exhaust pressure pulsations before the exhaust reaches the catalyst.
5. Provide an even distribution of exhaust flow across the face of the catalyst.

The exhaust velocity in the exhaust pipes at the point of entrance to the silencer/converter is 2900-3200 feet per minute at the design rated engine speed of 440 RPM with our standard production engines, which have a displacement volume of 2827 $in^3$ per cylinder. The exhaust velocity at the input face of the catalyst for the above conditions ranges from 500 to 600 feet per minute.

From the perspective of designing a successful oxidizing converter, the two important factors relating to chamber volumes are:
1. A first chamber volume that will damp out the exhaust pulsations, and
2. Enough length between the exits of the flow pipes to the second chamber to the catalyst face to allow the exhaust flow to be distributed evenly across the face of the catalyst. For example, with a silencer/converter cross sectional flow area of 8-12 ft2 and an exhaust flow of about 1400-1600 actual ft3/min per cylinder, this length would be a minimum of about 1½ feet.

The relationships of the other chamber volumes and flow areas between the chambers are important for exhaust noise silencing, but not for the catalyst application. These relationships are commonly used by manufacturers of exhaust silencers.

The silencer/converter system has been designed in both the vertical and horizontal configurations to cover the possible variations in field sites (See FIGS. 3 and 6).

Pressure Relief Valve:

A pressure relief valve (or valves) is (are) used to protect the catalyst elements from sudden high pressure excursions in the exhaust system (See FIGS. 3 and 6).

A pressure relief valve is preferably placed in the first volume chamber to protect the catalyst from high-pressure excursions in the exhaust system that are caused by occasional firing into the exhaust ports. Some incorrectly refer to these events as backfires.

Preferably, there is one relief valve per exhaust inlet or pair of exhaust inlets. The incoming exhaust is preferably aimed towards the pressure relief valve, which is generally located opposite from the exhaust inlets. The relief valve setting must accommodate the normal exhaust pressure fluctuations exhibited in the first volume chamber, but it must relieve immediately when a higher pressure pulse than normal occurs. The pressure relief valve needs to relieve at the lowest pressure that allows adequate safety margin from the normal engine operating conditions. By recording the exhaust pipe pressures as functions of time during normal operating conditions, the highest normal pressure pulse was determined to be about 3 psig. Allowing for about a one to two psi safety margin, the relief valve is set at 4-5 psig to protect the catalyst from a higher pressure excursion.

Lubricating Oil:

Unlike four stroke engines, two stroke engines must have lubricating oil added to the power cylinders. This oil is mixed with the fuel for gasoline engines and is directly injected into the power cylinders for natural gas fueled engines. Two stroke gas engine operation tends to form various deposits such as varnish, sludge and an ash residue that remains after the oil is burned during operation. Adding detergent/dispersant additives controls the varnish and sludge. However, these detergent/dispersant additives tend to leave a gray, fluffy ash residue after the oil has been burned. This ash residue is made up of metal sulfates from such additives as barium, calcium, phosphorus, zinc, magnesium and boron, which deactivate the exhaust catalyst by forming glassy-amorphous deposits, which prevent the exhaust gas from reaching the active surfaces of the catalyst.

The lubricating oil used in the present invention for the 2-stroke engine power cylinders is formulated to minimize the type of oil additives that would degrade the catalyst efficiency. The power cylinder lube oil is formulated so that the zinc content was reduced from about 300 ppm present in prior art oils to at most less than 10 ppm, preferably at most 5 ppm. Other metals that poison the catalyst are also preferably at low levels to avoid poisoning of the active sites of the catalyst.

Such lube oils are formulated to reduce the metallic additives while increasing some of the non-metallic additives to provide acceptable lubricating properties for the 2-stroke natural gas fueled engine. The lube oil provided for the experiments conducted herein was formulated by ExxonMobil, which modified its Mobil Pegasus Special 10W-40 with the special additives, which reduce the zinc content to less than 5 ppm while maintaining the required lubrication properties.

Preferably, the lube oils have a very low ash content. The term "ash" refers to a metal-containing compound wherein the metal can be zinc, sodium, potassium, magnesium, calcium, lithium, barium, and the like, as measured by ASTM D874. Ash can also contain sulfur in the form of sulfated ash. The term "very low ash content" refers to less than 0.10 wt % ash content in the lubricating oil composition. Very low ash lube oils reduce the sulfur oil combustion products, which poison the oxidation catalyst by masking the catalyst active sites.

Other lube oils for 2-stroke natural gas engines are commercially available, which have low metals content. Examples of these include Mysella 40 available from Shell Lubricants (0.01 sulfated ash % by mass, 0 zinc content % wt, 0.025 phosphorous wt, 0 calcium % wt) and Chevron HDAX ashless gas engine oils (nil sulfated ash wt, less than 10 ppm zinc content, 670 ppm phosphorous). As earlier noted, phosphorous and calcium also poison catalyst active sites.

If the lube oil were not reformulated to have a low zinc content and to have a very low ash content (according to ASTM method D874), then the initial emissions removal efficiencies for the catalyst would be about equal to the efficiencies measured during our experiments, but the catalyst would be poisoned and masked quicker. Since the emissions removal efficiencies would be expected to fall to unacceptable levels in less than six months of operation, the effects of operating without the reformulated oil were not measured. As noted earlier, metallic additives in the oil would cause catalyst degradation problems.

Catalyst Installation Rig (Optional Equipment):

An installation and removal rig for the catalyst element with the catalyst rack was designed so that a catalyst element and catalyst rack can be lifted, inserted into the converter housing, and extracted from the housing while working from the ground level (See FIG. 10). The rig has a tray with four lifting points. A heavy catalyst element with its catalyst rack is placed on the tray. Chains are attached to the lifting points. A hoist or block and tackle arrangement with a lifting cable or chain is attached to the chains attached to the tray. Once the tray is level with the access flange for the catalyst retainer rack housing and drawer slide in the second or catalyst chamber, the tray is secured to the access flange. Attached to tray opposite the access flange attachment is a rotatable wheel having female screw portion that receives an elongated male threaded rod that is attached on one end thereof to the catalyst rack at a point opposite to the access flange. The rotatable wheel is rotated using a sprocket and chain assembly or with a motor assist to push the catalyst rack in through the opening in the access flange onto the drawer slide or to withdraw the catalyst retainer rack from the second or catalyst chamber. Once the catalyst rack is fully inserted and resting on the drawer slide, the threaded rod is released from its attachment point on the catalyst rack and the access cover door is replaced on and attached to the access flange.

Materials of Construction:

Nearly all of the silencer/converter is constructed of 10-gauge sheet steel, but there are several places where an inner shell of the same material is used to produce the appropriate sound deadening qualities.

The frames for the catalyst elements and portions of the retaining rack for the elements are preferably fabricated with stainless steel.

The gaskets for the catalyst and for the access cover door are produced with a high temperature fiberglass material that provides good sealing up to about 900° F.

New or Retrofits:

This combination silencer/converter is preferably designed to be interchangeable with prior art exhaust silencers and can therefore be used on a new engine unit or as a field retrofit on an existing engine unit. In a retrofit situation, the engine lubricant would be changed to a lubricating engine oil having a zinc content less than 10 ppm, preferably less than 5 ppm, and is preferably also very low ash content. Such lubricating engine oils are used in conjunction with the silencer/converter unit of the present invention to extend the duration for achieving satisfactory emissions removal efficiencies for the catalyst.

BRIEF DESCRIPTION OF THE DRAWINGS

FIG. 3 is a schematic side elevation of a vertical embodiment of a silencer-catalytic converter according to the present invention.

FIG. 4 is a side view of the catalyst retainer rack of FIG. 3 with two catalyst elements.

FIG. 5 is a top view of a section of the catalyst chamber of FIG. 3 showing the catalyst retainer rack, its gasket, and the shoulder located within the catalyst chamber for seating the gasket.

FIG. 6 is a schematic side elevation and a partial cross-section of a horizontal embodiment of a silencer-catalytic converter according to the present invention.

FIG. 7 is a schematic end elevation of the silencer-catalytic converter in FIG. 6 showing the relative placement and angle of the exhaust inlet and the relief valve.

FIG. 8 is a side view of the catalyst retainer rack of FIG. 6 with four catalyst elements.

FIG. 9 is a top view of a section of the catalyst chamber of FIG. 6 showing the catalyst retainer rack, its gasket, and the shoulder located within the catalyst chamber for seating the gasket.

DETAILED DESCRIPTION

Figure 1:
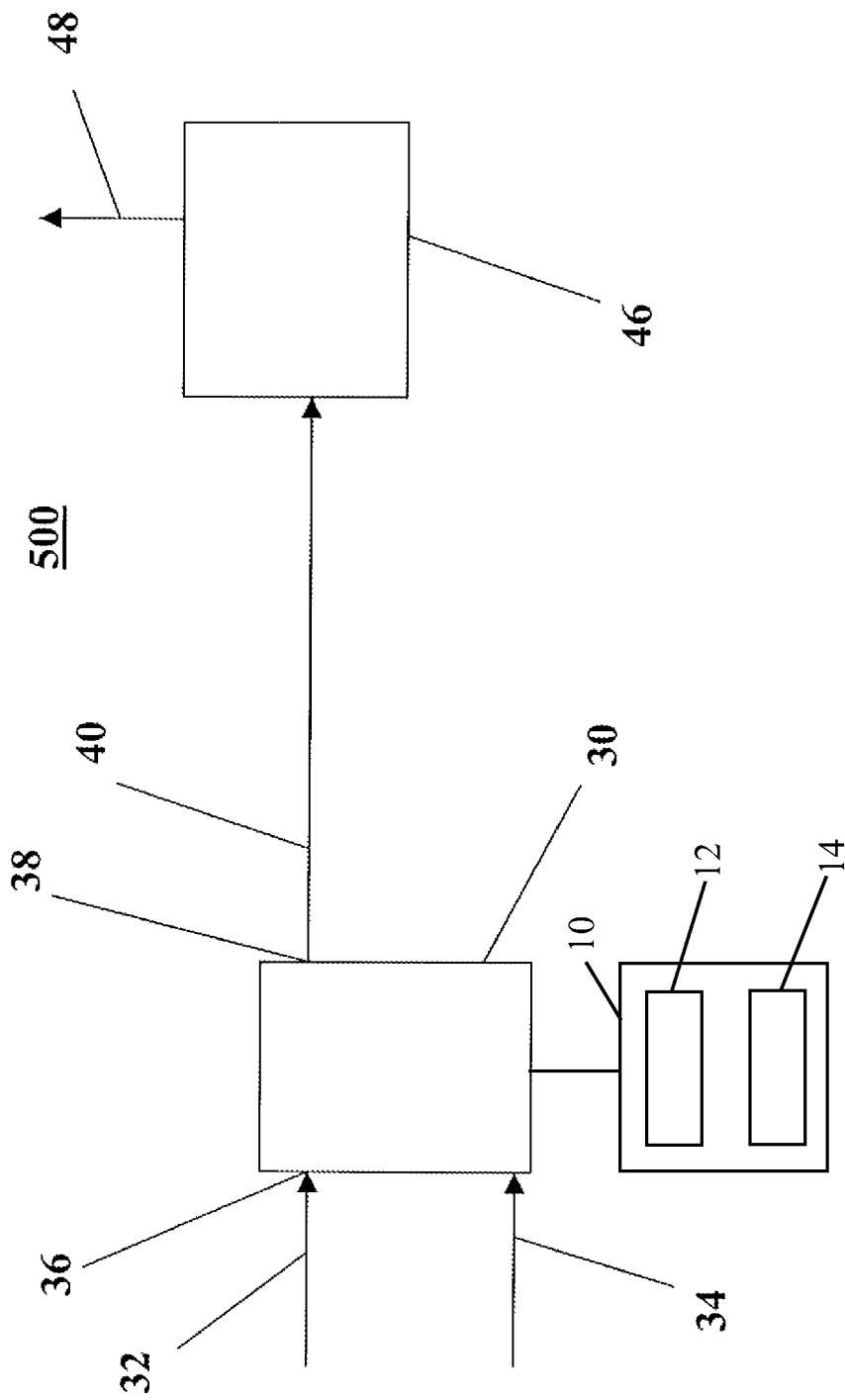
FIG. 1 is a schematic side elevation of a prior art internal combustion engine with a silencer.

Referring to FIG. 1, a prior art stationary two-stroke or two-cycle internal combustion engine system 500 is shown having from one to four cylinders, with only one cylinder 30 schematically shown. The cylinder 30 has an inlet port 36 and an exhaust port 38. A gaseous hydrocarbon fuel is fed into each cylinder 30 at the appropriate point in the engine's cycle via line 32 in fluid communication with the inlet port 36. A source of lubricating engine oil is provided to the engine via line 34. Details of the engine have been omitted from FIG. 1 for the sake of clarity. Stationary natural gas fueled 2-stroke engines typically operate at constant speeds in the range of from 200 to 1000 rpm, more typically 250 to 500 rpm.

In operation, a piston reciprocates within each cylinder 30 of the stationary engine. As the piston descends within the cylinder moving away from the cylinder head, it opens an inlet port 36, through which a gas or a mixture of gases is admitted and flows into the cylinder 30. At this time, the cylinder 30 is filled with gases which are products of combustion. In certain designs of engine, a mixture of gaseous fuel and air is admitted into the cylinder 30 through the inlet port 36 at this time. In other designs of engine, such as the Ajax® engines referred to above, air alone is admitted to the cylinder 30 through the inlet port 36. At the same time that the inlet port 36 is open, the descending piston also uncovers an exhaust port 38, through which the burnt gases leave the cylinder 30 via exhaust pipe 40, to form the exhaust gas of the engine. The action of the freshly charged gases entering the cylinder 30 through the inlet port 36 serves to assist with forcing the burnt gases out of the exhaust port 38, referred to as scavenging. The exhaust gases travel through the exhaust pipe 40, and then through the silencer 46 and exhaust stack 48.

Figure 2:
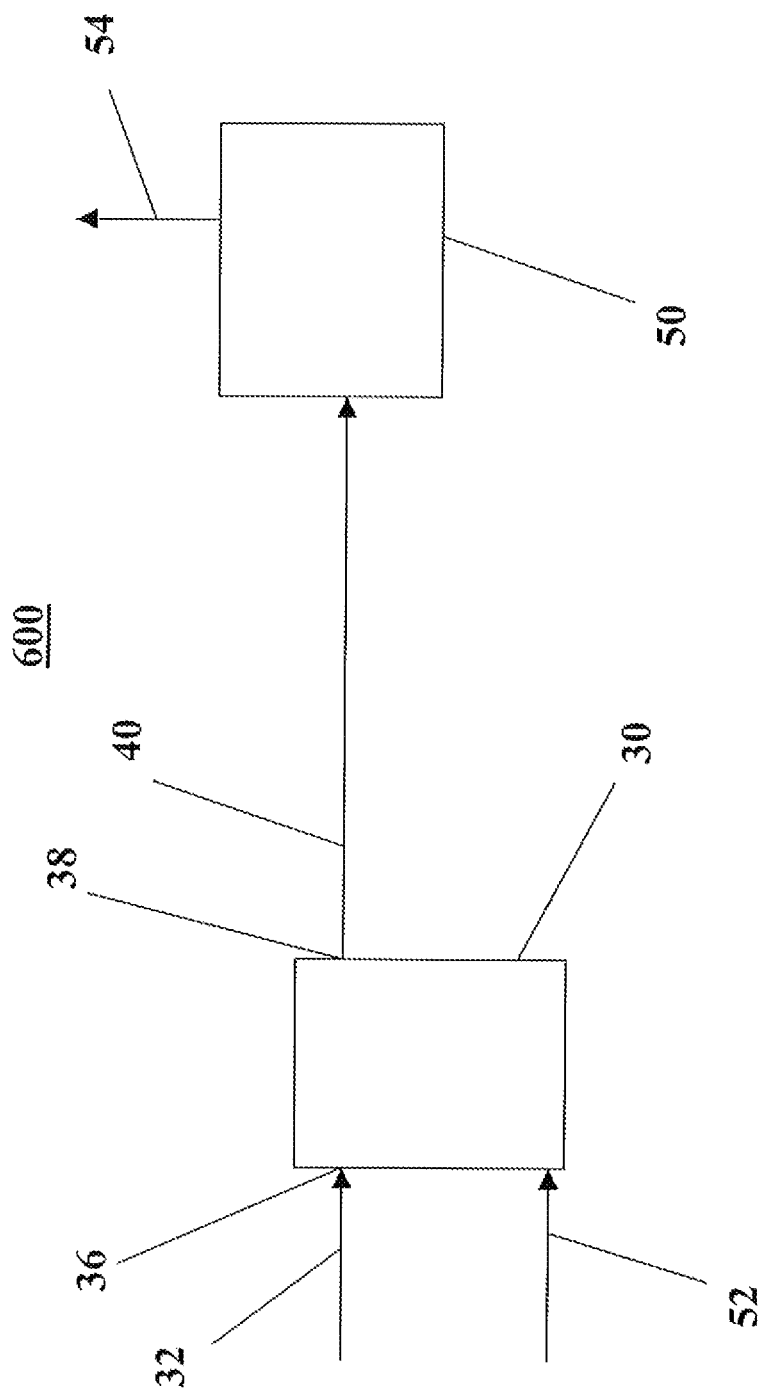
FIG. 2 is a schematic side elevation of an embodiment of an internal combustion engine with a silencer-catalytic converter according to the present invention.

Referring now to FIG. 2, there is shown an engine system 600 according to the present invention. System 600 requires the use of a stationary natural gas fueled 2-stroke engines that typically operate at constant speeds in the range of from 200 to 1000 rpm, more typically 250 to 500 rpm. These engines operate on a normally gaseous hydrocarbon as its fuel, for example, methane, ethane, propane and butane. System 600 differs from prior art system 500 in that the lubricating engine oil via line 34 is changed to be a lubricating engine oil via line 52 which has at most 10 ppm zinc and is preferably very low in ash content. Additionally, the silencer 46 and its exhaust stack 48 are changed to a silencer/catalyst converter unit 50 according to the present invention with its exhaust stack 54 to reduce the emissions in the exhaust. The silencer/converter unit 50 can be in vertical or horizontal embodiments. An example of a vertical embodiment is unit 100 and of a horizontal embodiment is unit 200, which are discussed further below. Though not shown, in another embodiment, an exhaust manifold can also be used. For example, the exhaust pipe 40 is connected to the exhaust manifold 42 (instead of directly to the silencer/catalyst converter unit 50) and a silencer line 44 is connected on one end to the exhaust manifold 42 and on the other end to the silencer/catalyst converter unit 50.

Referring now to FIG. 3, there is shown a schematic side elevation of a vertical embodiment of a silencer-catalytic converter unit 100 according to the present invention. Unit 100 has an outer shell 101 with a lower head 132 and an upper head 133 enclosing a first volume chamber 134, a second volume chamber 136, and a third volume chamber 138 vertically positioned relative to each other. A first baffle 102 separates the first volume chamber 134 and the second volume chamber 136. A second baffle 104 separates the second volume chamber 136 and the third volume chamber 138. The second chamber 136 has a catalyst holding area 116 having a catalyst access door 118.

Referring now to FIG. 4, there is shown a side view of a section of a catalyst holding area 116 of the catalyst or second volume chamber 136. The catalyst holding area 116 includes the catalyst retainer rack 128 that rides on the rack slide 129, a gasket 130 for the catalyst rack 128, and a shoulder 126 located within the catalyst chamber 136 for seating the gasket 130. Any suitable means for seating the catalyst rack 128 against the shoulder 126 with the gasket 130 between them can be used, for example, a cam device (not shown). An access door 118 is used to access the catalyst rack 128 for removing or installing the catalyst elements 124. A top view of the catalyst retainer rack 128 with two catalyst elements 124 is shown in FIG. 5.

Referring again to FIG. 3, the exhaust from the engine enters the first volume chamber 134 through exhaust inlet 110. The number of exhaust inlets 110 depends on the number of cylinders in the engine, typically one for each cylinder or a pair of cylinders. A relief valve 114 is generally positioned opposite the exhaust inlet 110. Due to the baffle 102 and changing the direction of flow of the exhaust within the first volume chamber 134, liquid and solid particulates are at least partially removed from the exhaust. These collect in the lower silencer head 132. A drain line and valve assembly 112 is attached to the bottom of the lower silencer head 132 to allow removal of any accumulated liquid and particulate solids.

The volume of the first volume chamber 134 is sufficient to dampen spurious pressure excursions or pulsations to avoid damage to the catalyst elements 124. The exhaust then exits the first volume chamber 134 through flow pipes 106 into the second volume chamber 136. The leading face of the catalyst elements 124 are spaced from the exit of the flow pipes 106 to allow a uniform flow of the exhaust across the face of the catalyst elements 124 to more fully utilize the available catalyst active sites in the catalyst elements 124.

After the exhaust passes through the catalyst elements 124, the exhaust exits the second volume chamber 136 into the third volume chamber 138 through flow pipes 108. The exhaust then exits the third volume chamber 138 through flow pipe 120, which enters the exhaust stack 122.

The volume of the second volume chamber 136 and the volume of the third volume chamber 138, along with the volume of the first volume chamber 134, are to produce the silencing effects of the unit 100.

Referring now to FIG. 6, there is shown a schematic side elevation in partial cross-section of a horizontal embodiment of a silencer-catalytic converter unit 200 according to the present invention. Unit 200 has an outer shell 140 with a first outer head 142 and a second outer head 143 enclosing a first volume chamber 174, a second volume chamber 175, a third volume chamber 176 horizontally positioned relative to each other with the third volume chamber 176 between the first and second volume chambers 174 and 175, respectively. A fourth volume 178 is located above the third volume chamber with a fifth volume chamber 179 above the fourth volume chamber. A first baffle 146 separates the first volume chamber 174 and the third volume chamber 176. A second baffle 147 separates the second volume chamber 175 and the third volume chamber 176. A third baffle 148 separates the third volume chamber 176 and the fourth volume chamber 178. The fourth volume chamber 178 has a catalyst holding area 164 having a catalyst access door 165. A fourth baffle 150 separates the fourth volume chamber 178 and the fifth volume chamber 179.

Referring now to FIG. 8, there is shown a side view of a section of a catalyst holding area 164 of the catalyst or fourth volume chamber 178. The catalyst holding area 164 includes the catalyst retainer rack 168 that rides on the rack slide 169, a gasket 170 for the catalyst rack 168, and a shoulder 172 located within the catalyst chamber 178 for seating the gasket 170. Any suitable means for seating the catalyst rack 168 against the shoulder 172 with the gasket 170 between them can be used, for example, a cam device (not shown). An access door 165 is used to access the catalyst rack 168 for removing or installing the catalyst elements 166. A top view of the catalyst retainer rack 168 with four catalyst elements 166 is shown in FIG. 9.

Referring again to FIG. 7, the exhaust from the engine enters the first volume chamber 174 through exhaust inlets 158A and 158B. The exhaust from the engine also enters the second volume chamber 175 through exhaust inlets 158C and 158D. In this embodiment, the unit 200 is for a 4-cylinder engine. The number of exhaust inlets 158 depends on the number of cylinders in the engine, typically one for each cylinder or a pair of cylinders. In this embodiment, the engine has 4 cylinders and there are four exhaust inlets 158A, 158B, 158C and 158D. A relief valve 162 is generally positioned opposite the exhaust inlets 158. In this embodiment, there are two relief valves 162—one for each of the first volume chamber 174 and the second volume chamber 175. Each relief valve 162 is positioned generally opposite from and between the respective exhaust inlets Therefore, one relief valve 162 is generally opposite and between the exhaust inlets 158A and 158B; and the other relief valve 162 is generally opposite and between the exhaust inlets 158C and 158D. When looking down the long axis L of the unit 200, the angle A between the axis R of the relief valve 162 and the axis E of the exhaust inlet 158 is at most 45 degrees.

Due to the baffles 146, 147 and 148, plus changing the direction of flow of the exhaust within the first, second and third volume chambers 174, 175 and 176, liquid and solid particulates are at least partially removed from the exhaust. These collect in the bottom of chambers 174, 175 and 176. A drain line and valve assembly such as assembly 112 shown in FIG. 3 are added to the bottoms of each of chambers 174, 175 and 176 to allow removal of any accumulated liquid and particulate solids therein.

The volumes of chambers 174, 175 and 176 are sufficient to dampen spurious pressure excursions or pulsations to avoid damage to the catalyst elements 166. The exhaust exits the first volume chamber 174 through flow pipes 152 into the third volume chamber 176. The exhaust exits the second volume chamber 174 through flow pipes 153 into the third volume chamber 176. The exhaust exits the third volume chamber 176 through flow pipes 154 into the catalyst chamber or fourth volume chamber 178. The leading face of the catalyst elements 166 are spaced from the exit of the flow pipes 154 to allow a uniform flow of the exhaust across the face of the catalyst elements 166 to more fully utilize the available catalyst active sites in the catalyst elements 166.

After the exhaust passes through the catalyst elements 166, the exhaust exits the fourth volume chamber 178 into the fifth volume chamber 179 through flow pipes 156. The exhaust then exits the fifth volume chamber 179 through the exhaust stack 160, which optionally has a flange as shown herein for attaching to a stack extension (not shown).

The volume of the fourth volume chamber 178 and the volume of the fifth volume chamber 179, along with the volume of chambers 174, 175 and 176, are to produce the silencing effects of the unit 200.

Figure 10:
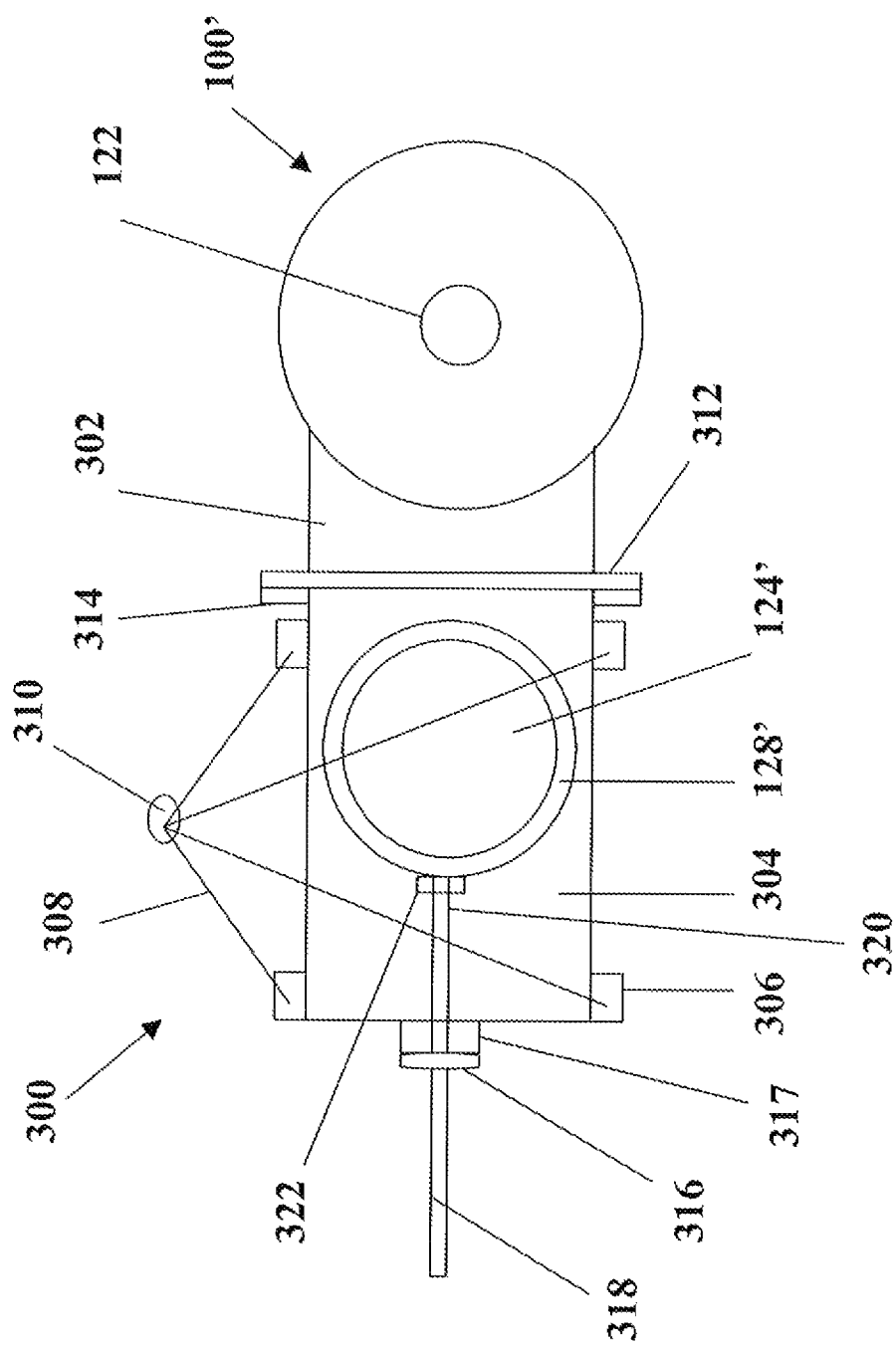
FIG. 10 is a schematic top view of an embodiment of an optional catalyst installation and removal system according to the present invention.

Referring now to FIG. 10, there is shown a top perspective elevation of an embodiment of a catalyst installation and removal system 300 according to the present invention used on a vertical unit 100', which is similar to unit 100, except that a single round catalyst element 124' with a round catalyst rack 128' is used instead. The system 300 was designed so that the catalyst element 124' and catalyst rack 128' can be lifted, inserted into the converter housing 302, and extracted from the housing 302 while working from the ground level. The system 300 has a tray 304 with four lifting points 306. A heavy catalyst element 124' with its catalyst rack 128' is placed on the tray 304. Chains 308 are attached to the lifting points 306. A hoist or block and tackle arrangement with a lifting cable or chain (not shown) is attached to a lifting eye 310 to which the chains 308 are attached. Once the tray 304 is level with the access flange 312 for the catalyst retainer rack housing 302 and drawer slide in the second or catalyst chamber, the tray 304 via its attachment ears 314 is secured to the access flange 312. Attached to tray 304 opposite the access flange 312 attachment is a rotatable wheel 316 on a mount 317, wherein the wheel 316 has a female screw portion that receives an elongated male threaded rod 318 that is attached on one end 320 to an attachment mount 322 on the catalyst rack 128' at a point opposite to the access flange 312. The rotatable wheel 316 is rotated using a sprocket and chain assembly or with a motor assist to push the catalyst rack 128' in through the opening in the access flange 312 onto the drawer slide 129 (see FIG. 4) or to withdraw the catalyst retainer rack 128' from the second or catalyst chamber 136 (see FIG. 3). Once the catalyst rack 128' is fully inserted and resting on the drawer slide 129, the threaded rod 318 is released from the attachment mount 322 on the catalyst rack 128' and the access cover door 118 (see FIG. 3) is replaced on and attached to the access flange 312.

Experiment

A vertical silencer-catalytic converter unit according to the present invention was installed on an Ajax® DPC-2802LE engine in the Ajax R & D Lab, and was tested for nearly 500 hours with the engine operating at full speed, nearly full torque, and close to the full rated BHP.

The Ajax® DPC-2802LE engine is a two-stroke, lean burn, natural gas fired engine. It has 2 power cylinders, each with a bore of 15 inches and a stroke of 16 inches. The engine speed is 265 to 440 rpm. The prior art silencer was replaced with a vertical silencer/converter like that shown in FIG. 3. However, the catalyst retaining rack was round as was the single catalyst element as shown in FIG. 10. The catalyst was about 3½ feet in diameter, 3.7 inches thick and weighed about 200 lbm. The catalyst was ADCAT™ catalyst from EAS, Inc. This catalyst uses platinum on a stainless steel honeycomb substrate. A catalyst lifting rig as shown in FIG. 10 was used to lift and install or remove the catalyst and catalyst rack from the silencer/converter. The overall height of the silencer/converter unit without the exhaust stack was about 16 feet with a diameter of about 3½ feet. The volume of the first chamber 134 was about 72 cu. ft. The volume of the second chamber 136 was about 42 cu. ft. The volume of the third chamber 138 was about 31 cu. ft. The distance between the exit of the flow pipe 106 and the leading face of the catalyst element 116 was about 1½ feet. There were 2 exhaust inlet 110 from the exhaust pipe(s) connected to the exhaust ports of the engine. The conventional lubricating engine oil that the engine used had about 300 ppm zinc. This oil was replaced with a modified Mobil Pegasus Special 10W-40 formulated by ExxonMobil to have less than 5 ppm zinc and had an ash content of less than 0.1 wt %. The average exhaust temperature at the catalyst location in the silencer/converter was about 640 degrees F.

Initial performance for this invention achieved 93% removal of the CO emissions and 91% removal for the formaldehyde. Although these efficiencies were better than expected, a major feature of this invention is to prevent premature degradation of the catalyst removal efficiencies. As reported by DeFoort et al, their tests of oxidizing catalysts with 2SLB engines indicated that the removal efficiencies dropped to unacceptable levels within less than two weeks.

Figure 11:
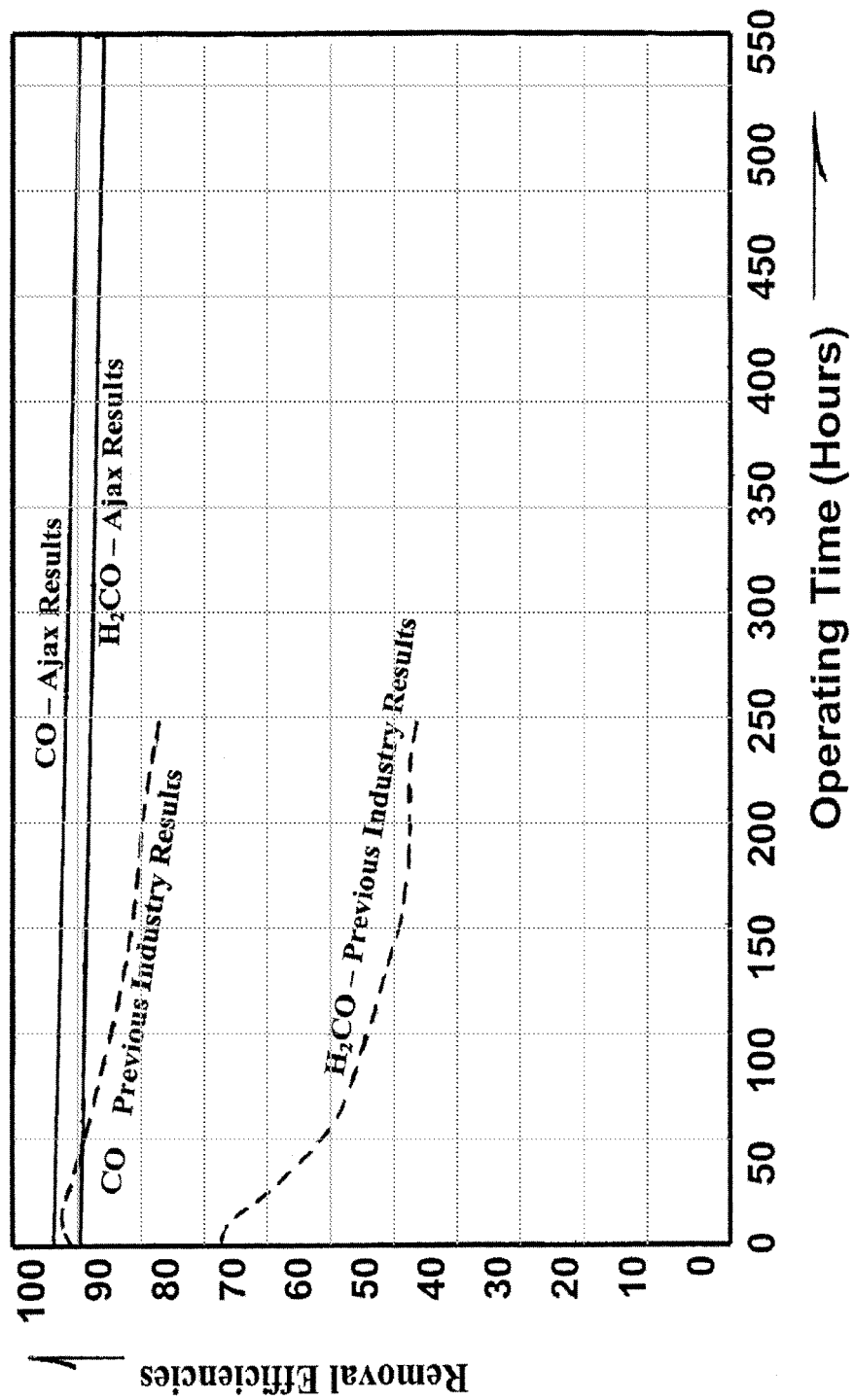
FIG. 11 is a graph of catalyst efficiency curves showing previous industry results using dashed lines and the results obtained during the experiment reported herein.

Catalyst efficiency curves are presented in FIG. 11. These curves express the removal efficiencies vs. hours of operation for this invention as compared to those reported by DeFoort et al., who used oxidizing converters on 2SLB engines.

Standard exhaust emissions levels for Ajax® LE engines operating with pipeline quality fuel at the design rating with site elevations less than 1500 FASL (feet above sea level) are:

NOX=2.0 gm/BHP-hr
CO=1.2 gm/BHP-hr
NMHC=1.2 gm/BHP-hr
H2CO=0.29 gm/BHP-hr

This catalyst and silencer/converter have been tested for nearly 500 hours at the design rating for the engine, and the oxidizing efficiencies were almost equal to the efficiencies recorded at the start of the tests.

Our Lab tests of the EAS oxidizing catalyst with the Ajax® DPC-2802LE engine included 430 hours with the full catalyst flow area, followed by 51 hours with 60% of the flow area. Our reasons for blocking 40% of the flow area were (1) to resolve the problem with $NO_X$ increase across the catalyst and (2) to determine the amount of catalyst needed for field applications.

The results from the Lab tests are in the following Table, which includes five columns expressing the average engine data and catalyst data during five time periods of the testing, which are defined in the accumulated hours row of the spreadsheet.

The main conclusions from this testing are:
1. The CO and H2CO removal efficiencies are substantially maintained over these 500 hours.
2. Degradation of the removal efficiencies was minimal during the 481 hours of testing. These efficiencies dropped by only 2-3% during this phase of the test project.
3. The NOX increase across the catalyst was unacceptable during the first 430 hours of testing. This increase averaged 23% during this time. The source for the nitrogen that was being converted to NOX was the nitrogen containing compounds in the lube oil. Mobil reports that it is not viable to reduce these compounds by a significant amount.
4. With 40% of the catalyst flow area blocked off, the NOX increase is acceptable. During the last 30 hours of testing, this increase averaged less than 5%. Blocking 40% of the catalyst flow area had minimal effects on the removal efficiencies for the CO and H2CO.
5. Though emissions removal efficiencies are expected to degrade over time, removal efficiencies which should be achievable for at least six months are expected to be:
CO—70% reduction
H2CO—60% reduction.

TABLE

Average Data During 481 Hours of Catalyst Operation

| Catalyst Type & Flow Area | EAS - 100% | EAS - 100% | EAS - 100% | EAS - 60% | EAS - 60% |
|---|---|---|---|---|---|
| Hours Accumulated with Catalyst | 0-60 | 60-231 | 231-430 | 430-451 | 451-481 |
| Engine Speed | 440 | 440 | 440 | 440 | 440 |
| BHP (% of Full Rated BHP) | 361 (94%) | 352 (92%) | 352 (92%) | 352 (92%) | 384 (100%) |
| Exhaust Flow (SCFM) | 1670 | 1670 | 1660 | 1650 | 1650 |
| Exhaust Temp. (° F. before catalyst) | 648 | 645 | 640 | 650 | 670 |
| Exhaust Temp. (° F. after catatalyst) | 608 | 608 | 600 | 612 | 636 |
| % Oxygen in the Exhaust | 14.2 | 14.3 | 14.2 | 14.3 | 13.8 |
| Exhaust Press. at Silencer/Converter Inlet ("H$_2$O) | 3.3 | 3.2 | 3.2 | 3.2 | 3.65 |
| Pressure Drop across the Catalyst ("H$_2$O) | 0.4 | 0.5 | 0.5 | 0.55 | 0.9 |
| CO (gm/BHP-hr Before Catalyst) | 1.4 | 1.4 | 1.3 | 1.4 | 1.7 |
| CO (gm/BHP-hr After Catalyst) | 0.07 | 0.10 | 0.09 | 0.11 | 0.14 |
| CO (ppm Before Catalyst) | 153 | 152 | 143 | 150 | 187 |
| CO (ppm After Catalyst) | 8 | 10 | 11 | 12 | 16 |
| CO Removal Efficiency (%) | 94.7 | 93.4 | 92.3 | 92.0 | 91.4 |
| H$_2$CO (gm/BHP-hr Before Catalyst) | 0.16 | 0.16 | 0.19 | 0.15 | 0.18 |
| H$_2$CO (gm/BHP-hr After Catalyst) | 0.015 | 0.016 | 0.019 | 0.015 | 0.020 |
| H$_2$CO (ppm Before Cat.) | 23 | 23 | 27 | 20 | 25 |
| H$_2$CO (ppm After Cat.) | 2 | 2.3 | 2.9 | 2.0 | 2.7 |
| H$_2$CO Removal Efficiency (%) | 91.3 | 90.0 | 89.3 | 90.0 | 89.2 |
| NO$_X$ (gm/BHP-hr Before Catalyst) | 1.04 | 0.85 | 0.9 | 0.70 | 1.80 |
| NO$_X$ (gm/BHP-hr After Catalyst) | 1.35 | 1.02 | 1.10 | 0.77 | 1.89 |
| NO$_X$ (ppm Before Cat.) | 70 | 56 | 60 | 47 | 123 |
| NO$_X$ (ppm After Catalyst) | 91 | 67 | 73 | 52 | 129 |
| NO$_X$ Increase Across Catalyst (%) | 30.0 | 19.6 | 21.7 | 10.6 | 4.9 |

While the preferred embodiments of the present invention have been shown in the accompanying figures and described above, it is not intended that these be taken to limit the scope of the present invention and modifications thereof can be made by one skilled in the art without departing from the spirit of the present invention.

What is claimed is:

1. A system, comprising:
  a catalytic converter, comprising:
    a flow path of a gas;
    a first chamber comprising a catalytic element disposed in the flow path;
    a second chamber comprising a solid and liquid particulate removal system comprising a gas chamber disposed in the flow path upstream from the catalytic element, wherein the solid and liquid particulate removal system is configured to remove solid and liquid particulate from the gas into a portion of the gas chamber to protect the catalytic element;
    a divider disposed between the first and second chambers, and a plurality of tubes fluidly coupling the first chamber with the second chamber; and
    a pressure damping system disposed in the flow path upstream from the catalytic element, wherein the pressure damping system is configured to protect the catalytic element.

2. The system of claim 1, wherein the pressure damping system is configured to damp pressure fluctuations in the gas to protect the catalytic element.

3. The system of claim 1, comprising an engine having the catalytic converter.

4. The system of claim 3, wherein the engine comprises a two-stroke engine.

5. The system of claim 3, comprising a compressor coupled to the engine, a generator coupled to the engine, or a combination thereof.

6. The system of claim 3, wherein a normal engine operating range of the engine comprises an engine speed of less than 1000 RPM and a brake horsepower (BHP) of at least 60 to 200 BHP per cylinder.

7. The system of claim 1, wherein the plurality of tubes is separate from the solid and liquid particulate removal system, and wherein a first volume of the first chamber is at least 1.5 times a second volume of the second chamber.

8. The system of claim 3, wherein the engine has one or more cylinders with a diameter of at least 14 inches, a stroke length of at least 14 inches, or a combination thereof.

9. The system of claim 3, wherein the engine is rated for fuels with a lower heating value (LHV) of 450 to 1500 BTU/ft$^3$.

10. The system of claim 1, wherein the solid and liquid particulate removal system comprises a drain configured to remove solid and liquid particulate.

11. The system of claim 1, wherein the solid and liquid particulate removal system is configured to reduce a velocity and turn a direction of the gas in the gas chamber along the flow path to cause drop out of the solid and liquid particulate from the gas into the portion of the gas chamber.

12. The system of claim 1, wherein the pressure damping system comprises a pressure relief valve configured to selectively open to release a pressure out of the flow path upstream from the catalytic element to protect the catalytic element from pressure fluctuations if the pressure exceeds a threshold pressure.

13. The system of claim 12, wherein the pressure relief valve is disposed opposite from a gas inlet into the catalytic converter.

14. A system, comprising:
  a catalytic converter, comprising:
    a flow path of a gas;
    a first chamber comprising a catalytic element disposed in the flow path; and
    a particulate removal system comprising a gas chamber disposed in the flow path upstream from the catalytic element, wherein the particulate removal system is configured to reduce a velocity and turn a direction of the gas along the flow path to cause drop out of solid and liquid particulate from the gas into a portion of the gas chamber to protect the catalytic element; and a divider separating the first chamber and the gas chamber, and a plurality of tubes fluidly coupling the first chamber and the gas chamber.

15. The system of claim 14, wherein the particulate removal system comprises a drain configured to remove the solid and liquid particulate from the gas to protect the catalytic element.

16. The system of claim 14, wherein the catalytic converter is configured to couple to an engine having a normal engine operating range with an engine speed of less than 1000 RPM, a brake horsepower (BHP) of at least 60 to 200 BHP per cylinder, one or more cylinders with a diameter of at least 14 inches, a stroke length of at least 14 inches, or a combination thereof.

17. The system of claim 14, comprising an engine having the catalytic converter.

* * * * *